United States Patent
Miettinen

(10) Patent No.: US 6,934,169 B2
(45) Date of Patent: Aug. 23, 2005

(54) METHOD OF CONTROLLING HALF-CONTROLLED RECTIFIER, AND RECTIFIER STRUCTURE

(75) Inventor: Erkki Miettinen, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/016,984

(22) Filed: Dec. 21, 2004

(65) Prior Publication Data

US 2005/0105312 A1    May 19, 2005

Related U.S. Application Data

(63) Continuation of application No. PCT/FI04/00241, filed on Apr. 20, 2004.

(51) Int. Cl.[7] .................................. H02M 7/04

(52) U.S. Cl. .......................... 363/88; 363/81

(58) Field of Search .................. 363/44, 52, 54, 363/81, 84, 85, 88, 125, 128

(56) References Cited

U.S. PATENT DOCUMENTS

| | | | | |
|---|---|---|---|---|
| 4,315,305 A | * | 2/1982 | Siemon | 363/88 |
| 4,376,968 A | * | 3/1983 | Wueschinski et al. | 363/37 |
| 4,811,189 A | * | 3/1989 | Harvest et al. | 363/53 |
| 6,038,155 A | | 3/2000 | Pelly | |
| 6,222,749 B1 | * | 4/2001 | Peron | 363/125 |
| 6,493,245 B1 | * | 12/2002 | Phadke | 363/54 |

FOREIGN PATENT DOCUMENTS

| | | |
|---|---|---|
| DE | 9216662 | 1/1993 |
| DE | 19508348 | 9/1996 |
| DE | 19710371 | 9/1998 |
| JP | 01308170 | 12/1989 |

* cited by examiner

*Primary Examiner*—Gary L Laxton
(74) *Attorney, Agent, or Firm*—Dykema Gossett PLLC

(57) ABSTRACT

A method of controlling a half-controlled rectifier, and a rectifier structure, which comprises an n-phased half-controlled converter bridge, a DC intermediate circuit and a capacitor of the DC intermediate circuit. The converter structure further comprises an auxiliary intermediate circuit and a non-controlled n-phased diode rectifier bridge which feeds the auxiliary intermediate circuit and is connected to the DC intermediate circuit by isolating diodes.

7 Claims, 2 Drawing Sheets

METHOD OF CONTROLLING HALF-CONTROLLED RECTIFIER, AND RECTIFIER STRUCTURE

CROSS-REFERENCE TO RELATED APPLICATION

This application is a continuation of PCT/FI04/000241, filed Apr. 20, 2004.

BACKGROUND OF THE INVENTION

The invention relates to a method and an apparatus according to the preambles of independent claims 1 and 5.

High-power frequency converters provided with a voltage intermediate circuit conventionally comprise a rectifier, which is separate from the inverter part and implemented as an n-phased half-controlled diode bridge. A capacitor battery of a DC intermediate circuit is fed by the rectifier to produce direct voltage in the intermediate circuit. The lower branches of such a rectifier bridge are diodes, and the upper branches are controllable components, most typically thyristors.

When the rectifier is switched on, it must be ensured before the thyristors are controlled into the diode mode that the capacitor battery of the intermediate circuit has been charged nearly up to its final voltage, because otherwise a high current pulse taken from the network may burn protective fuses. The charging may be implemented by using either a resistor or adjusting the phase angle of the thyristors. The purpose is to charge the capacitor battery up to its maximum voltage by restricting the magnitude of the current flowing into the capacitor of the intermediate circuit. The components in the upper branch cannot be controlled with full control until the voltage of the intermediate circuit is at its maximum or close to it, in which case the components functionally correspond to diodes, i.e. they are conductive always when this is enabled by the voltage acting over the component. If the components in the upper branch are implemented as diodes, current has to be restricted resistively.

U.S. Pat. No. 6,038,155 discloses an integrated circuit intended to control the phase angles of the thyristors in the upper branch of the rectifier for charging the capacitor battery.

A problem associated with prior art is that the rectifier control is bound to a certain voltage level which is to be reached in the DC voltage circuit. In that case, the rectifier bridge has to be adapted for each line voltage and information on the voltage to be reached has to be provided for the rectifier bridge controller. In addition, in several solutions, the size of the capacitor battery of the intermediate circuit, the frequency of the supply network and the order and number of phases have to be taken into account in the rectifier bridge control. This limits the versatility of the controller and its adaptability to changing conditions since the changes have to be always accounted for in the commissioning stage.

Furthermore, prior art devices often suffer from problems caused by ground faults in the inverter output and intermediate circuit and by general interference in the supply network. The rectifier part of the frequency converter should be able to feed direct voltage into the capacitor battery and further into the inverter part to ensure reliable operation regardless of frequency changes or voltage interferences in the supply network. In the worst case, a momentary interference in the supply voltage, such as a drop in the frequency or voltage level, results in a decrease in the voltage of the intermediate circuit in the frequency converter. When the interference disappears, current is still fed into the capacitor battery at full control regardless of the decrease in the voltage of the capacitor battery. This results in a considerable overcurrent, which burns the overcurrent protectors, and consequently the use is interrupted.

BRIEF DESCRIPTION OF THE INVENTION

The object of the invention is to provide a method and an apparatus which avoid the disadvantages described above and enable production of direct voltage in a more flexible manner by means of simple circuit solutions. This object is achieved by a method and an apparatus which are characterized by what is stated in the characterizing parts of the independent claims. The preferred embodiments of the invention are disclosed in the dependent claims.

The idea underlying the invention is that an auxiliary intermediate circuit, which is fed by a normal uncontrolled n-phased diode bridge, is connected via isolating diodes to a DC intermediate circuit fed by a halfcontrolled rectifier bridge. The auxiliary intermediate circuit is employed in the control to produce a reference voltage level up to which the DC intermediate circuit is charged.

The method and apparatus according to the invention provide a complete independence of the frequency and amplitude of the supply voltage. Controls are implemented on the basis of the voltage level of the auxiliary intermediate circuit, in which case it is unnecessary to determine or know any absolute voltage.

The auxiliary intermediate circuit and its converter bridge can also be used for feeding a power source, which produces auxiliary voltage for circuits requiring it. The auxiliary intermediate circuit can also be provided with a transient voltage limiter, in which case one limiter can be utilized for cutting voltage peaks from all supply phases.

BRIEF DESCRIPTION OF THE FIGURES

The invention will now be described in greater detail by preferred embodiments with reference to the accompanying drawings, in which.

DETAILED DESCRIPTION OF THE INVENTION

The method according to the invention can be divided into two operation modes on the basis of its operation: a charging mode, where the rectifier bridge is controlled to charge the capacitor battery of the voltage intermediate circuit, and a diode mode, where the rectifier bridge is controlled to feed the full voltage into the capacitor battery of the DC intermediate circuit.

Figure 1:
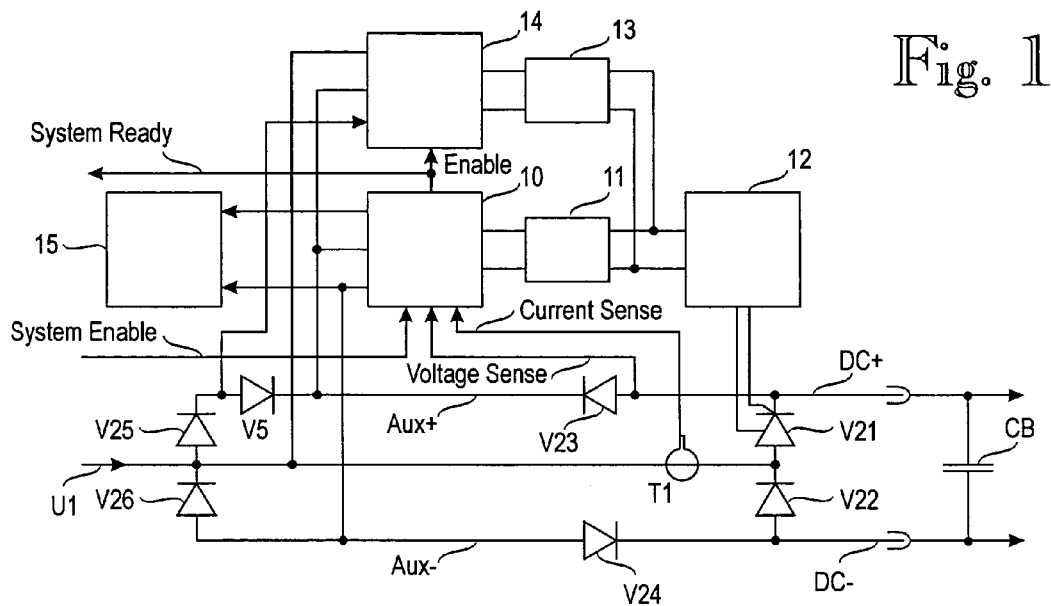
FIG. 1 is a block diagram illustrating implementation of a method according to the invention.

FIG. 1 shows a schematic block diagram illustrating the operation of the solution according to the invention and the structure in respect of one phase. As is well known, the main part of the rectifier circuit consists of bridge-connected rectifier components V21 and V22. V21 is a component which in triggered from the gate, in particular a thyristor, and V22 is a diode. The phase input Uin is fed between these components as shown in FIG. 1. The supply voltage is rectified by the bridge circuit to the DC intermediate circuit, and the voltage is stored in a capacitor or a capacitor battery CB connected between the positive bus DC+ and the negative bus DC− of the intermediate circuit. As stated above, FIG. 1 illustrates the structure in respect of only one phase. It is, however, clear that as the number of phases increases, the bridge circuits of all phases are connected to the same intermediate circuit.

According to the invention, the positive busbar DC+ of the DC intermediate circuit is further connected to the positive busbar Aux+ of the auxiliary intermediate circuit by means of an isolating diode V23. Correspondingly, the negative busbar DC− of the DC intermediate circuit is connected to the negative busbar Aux− of the auxiliary intermediate circuit by means of a second isolating diode V24. Rectified voltage is generated in the auxiliary intermediate circuit by diodes V25 and V26, which form an uncontrolled bridge circuit to rectify the phase voltage Uin. As in the case of bridges connected to the DC intermediate circuit, all phases of the voltage to be rectified feed the same auxiliary intermediate circuit. Thus rectified voltage can be generated in the usual manner in the auxiliary intermediate circuit, the voltage being a six-pulse voltage in connection with a three-phase voltage, for example.

One purpose of the isolating diodes V23 and V24 is to isolate the DC intermediate circuit from the auxiliary intermediate circuit so that current cannot flow from the auxiliary intermediate circuit to the DC intermediate circuit. Had the intermediate circuits not been isolated from each other, current would flow from the auxiliary intermediate circuit to the DC intermediate circuit and possibly to its large capacitor. In that case, current would be considerably high and damage the components of the electric circuit.

In the charging mode, the voltage of the DC intermediate circuit is increased in a controlled manner to the target level. When charging begins, the capacitor battery or the capacitor of the intermediate circuit is typically totally or nearly uncharged. The capacitor charging rate is adjusted by controlling the triggering instant of the components to be triggered from the gate and connected to the DC intermediate circuit, i.e. thyristors, with respect to the network cycle. The thyristor may be triggered in a known manner when the anode voltage is higher than the cathode voltage. The thyristor, however, cannot be switched off actively, but it is quenched when current stops flowing though it. This quenching situation is called natural commutation.

In the example illustrated in FIG. 1, the circuits of the charging mode are switched on by activating a 'System Enable' signal, which is transmitted to the charging circuit 10. This circuit feeds short pulses through an optoisolator 11 and a drive circuit 12 to the thyristor gate at instants when the thyristor is triggered slightly before it is quenched by natural network commutation. As a result of this, a current pulse cut from a network cycle is transmitted from the DC intermediate circuit to the capacitor battery of the DC intermediate circuit, which increases the terminal voltage of the battery.

The amplitude of the current pulse is dependent on the inductance limiting the current and on how long before the commutation moment a gate pulse is given. According to the invention, phase current is measured by a current transformer T, and if the current pulse is too high, the instant of giving the gate pulse is delayed, and thus the amplitude of the following current pulse no longer increases. This method enables charging of a previously unknown and very large capacitor battery while restricting current. On the other hand, burning of feed fuses is avoided even when the DC intermediate circuit is in short circuit.

According to the invention, the instant of the gate pulses is advanced all the time, and thus the voltage of the capacitor battery approaches the rectified voltage of the auxiliary intermediate circuit. When it is noted according to the invention that the voltage difference between these voltages is sufficiently small, a switch to the diode mode takes place, and the signal informing the user of the switch, 'System Ready', is activated. In that case, the thyristors are controlled to the conductive state for the maximum period, i.e. to function as diodes would function in place of the thyristors.

In the diode state, the momentous phase voltage, i.e. the anode voltage of the thyristor V21, is compared to the voltage of the positive busbar Aux+ in the auxiliary intermediate circuitry 14 according to the invention. When this difference is below a predetermined limit, gate current is given to the thyristor via the optoisolator 13 and drive circuit 12 according to FIG. 1. Current is supplied until the difference between the voltages exceeds the predetermined limit. Due to continuous gate voltage, the thyristor is triggered immediately when its anode voltage exceeds the cathode voltage. According to the invention, gate current is thus produced from the instant the anode voltage has increased to a maximum threshold voltage lower than the voltage of the positive busbar of the auxiliary intermediate circuit until the anode voltage drops below the same threshold. For example, 12 V can be selected as the limit voltage.

The thyristor is quenched due to natural network commutation and gate voltage stops from flowing when the anode voltage of the thyristor is 12 V lower than the voltage of the positive busbar of the auxiliary intermediate circuit. Thanks to the isolating diodes, the voltage of the positive busbar in the auxiliary intermediate circuit follows the voltage of the DC intermediate circuit regardless of the load of the auxiliary intermediate circuit. According to this feature of the invention, no gate voltage is fed into the thyristor when they are biased in the reverse direction, which prevents back current losses from increasing.

The thyristor may also be quenched by short notches in the line voltage if they are so deep that the thyristor becomes biased in the reverse direction. When the voltage in the reverse direction is higher than the 12 volts given as an example, the flow of gate current stops according to the invention. However, gate current starts to flow immediately when the voltage in the reverse direction drops below 12 volts. Thus the thyristor is ready to be triggered immediately when the anode voltage exceeds the cathode voltage. Consequently, it functions as a diode in these cases, too.

The phenomenon described above also occurs when the voltage of the DC intermediate circuit, and that of the auxiliary intermediate circuit due to isolating diodes increase at least 12 volts over the rectified value as a consequence of motor braking of the inverter part. As described above, gate current stops from flowing but the thyristors cannot be triggered, either, since they are biased in the reverse direction.

According to an embodiment of the invention, a transient suppressor is connected to the auxiliary intermediate circuit to cut overvoltage in all supply phases. Thus the solution according to the embodiment requires only one transient suppressor for protecting all phases.

According to an embodiment of the invention, the auxiliary intermediate circuit is arranged to feed voltage into a power source 15. Such a power source can be used for feeding all circuits requiring auxiliary voltage. The power resource receives rectified voltage from the auxiliary intermediate circuit, and the voltage can be processed further in the power source in a desired manner.

In the following, the functioning of the invention is described with reference to the embodiments illustrated in the figures.

Charging Mode

Figure 2:
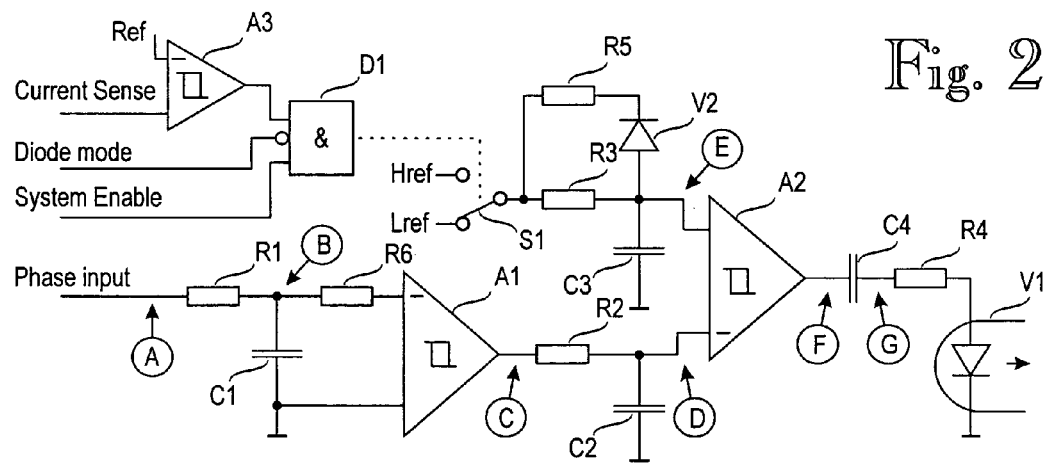
FIG. 2 illustrates a circuit solution for a charging mode.

FIG. 2 illustrates an embodiment of the invention describing operation in connection with the charging mode, in particular. In the embodiment of FIG. 2, a charging synchronization circuit is formed by two integrators, whose function is to filter all interfering factors from the network voltage. The instant when the gate pulse is given to the thyristor with respect to the phase voltage is determined by a ramp comparator, which controls gate current through the led of the optoisolator and the drive circuit.

In point A, phase voltage is led to a first integrator R1-C1, at whose output, point B, there is a dampened cosine wave form, i.e. a wave form which is nearly 90° behind the phase voltage. The comparator A1 detects the zero-crossing points of the wave form B, from which the square wave at point C is obtained by inversion. The integrator R1-C1 is connected to the comparator A1 via a protective resistor R6. The square wave of point C is nearly 270 degrees behind the phase voltage of point A. The square wave is supplied to a second integrator R2-C2, at whose output, point D, there is a wave form resembling a triangular wave. The wave form of point D is very pure, having no trace of any interference peaks or notches of line voltage.

According to the embodiment, a ramp wave increasing slowly in the positive direction is formed at point E by means of integrator R3-C3 in FIG. 2. The integrator is controlled by switch S1 from reference potentials Lref and Href. Lref is negative and Href positive. The component values of the integrator R2-C2 have been selected so that the wave form of point D stays within the whole frequency area defined for input voltages between the above-mentioned reference potentials.

The switch S1 is controlled by signals 'System Enable' and 'Diode Mode' via an AND member D1 and by signal 'Current Sense' via comparator A3. When the former is active and the latter inactive, the switch turns to position Href and the ramp wave of point E starts to increase from potential Lref. If the latter signal becomes active, the switch turns back to position Lref. In that case the ramp wave starts to decline.

The ramp wave of point E and the triangular wave form of point D are compared by comparator A2. The ascending ramp wave finally intersects the triangular wave form, in which case the comparator A2, which switches its mode, controls a short current pulse via derivator C4-R4 and the led of the optoisolator V1. The light produced generates a gate voltage pulse for the thyristor.

The first intersection thus takes place in the descending portion of the triangular wave, close to its minimum point, which is nearly at the same point as the minimum of the line voltage. It is, however, behind the natural network commutation point. Thus the first gate pulse occurs at an instant when the thyristor has been biased in the reverse direction for a while. This means a negative ignition advance and the thyristor cannot be triggered.

The following intersections take place as the ramp wave increases earlier and earlier until the commutation instant is reached. The triggering advance of the following gate pulse becomes positive and triggers the thyristor since it is now for the first time biased in the forward direction. The change rate of the line voltage is rather high at this instant, for which reason the conducting time of the thyristor remains short and its energy content low before commutation to the off state. The short conducting time also means a small current pulse, which in normal conditions is only a fraction of the nominal phase current.

If the capacitance of the capacitor in the DC intermediate circuit is, however, very high or the intermediate circuit is completely in short circuit, a point where the phase current exceeds the reference level Ref of the comparator A3 is reached fast. In that case, the switch S1 turns to position Lref for a moment and the ramp wave decreases rapidly due to the diode V2 and resistance R5. The higher the exceeding of the phase voltage, the longer the descending portion of the ramp wave lasts. Thanks to this function according to the invention, the current remains within acceptable limits and no fuse will burn out.

Figure 3:
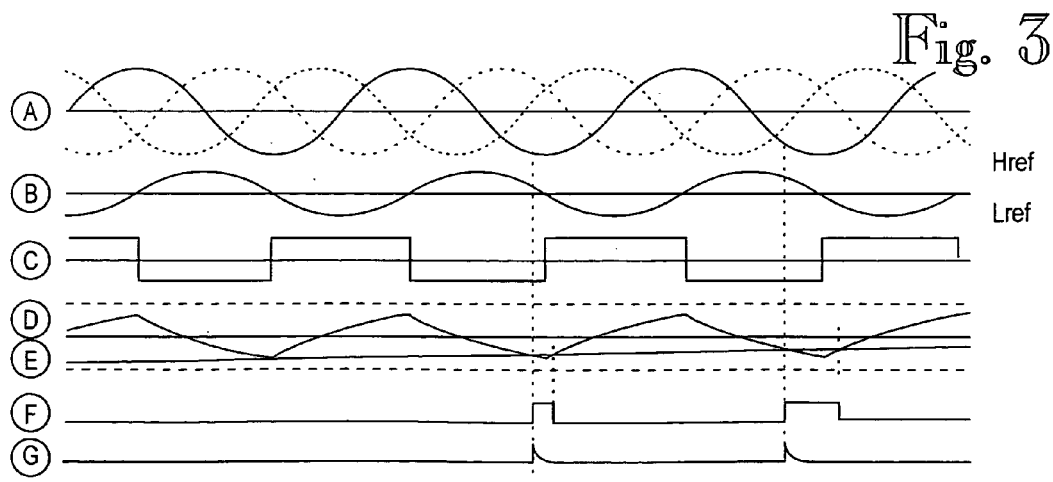
FIG. 3 illustrates curve forms of the charging mode.

FIG. 3 illustrates the wave forms explained above graphically. It can be seen from FIG. 3 how the starting instant of the gate pulses advances as the intersection point of the wave forms D and E moves towards the positive direction of the triangular wave form. FIG. 3 also shows a commutation instant CP and a first pulse FP.

Regognition of Switch to Diode Mode

When the voltage of the DC intermediate circuit rises in the charging mode, the ultimate goal is to reach the voltage level prevailing in the auxiliary intermediate circuit. For this reason, when applying the invention, it is unnecessary to know the magnitude of line voltage but the voltages of the positive busbars of the two intermediate circuits can be compared with each other. The negative busbars of both intermediate circuits are in the same potential due to diodes in the lower branch, i.e. diodes connected to the negative busbars of both intermediate circuits. The voltages of the positive busbars of the intermediate circuits are compared employing, for example, the circuit solution illustrated in FIG. 4.

Figure 4:
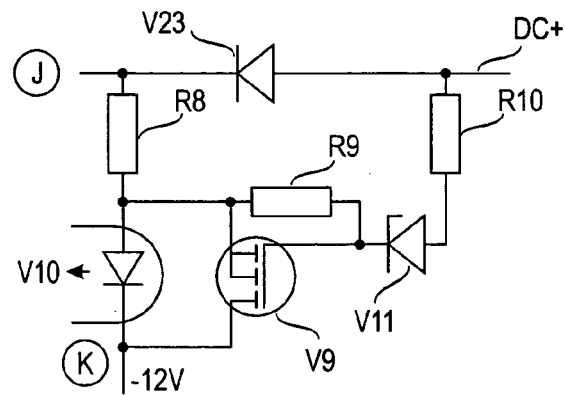
FIG. 4 illustrates a circuit implementing switch from the charging mode into the diode mode.

In FIG. 4, the drain electrode of the FET switch V9 is connected to potential J, i.e. to potential K which is 12 volts more negative than the positive busbar of the auxiliary intermediate circuit. When the charging of the empty capacitor battery of the DC intermediate circuit starts, full auxiliary intermediate voltage acts over the isolating diode V23 and the FET switch V9 is in the conductive state as resistances R9 and R10 generate voltage for the FET switch which is negative with respect to its source electrode. The FET switch V9 shorts the led of the optoisolator V10, and thus no light is produced.

When the voltage of the bc intermediate circuit approaches the voltage of the auxiliary intermediate circuit, the gate control of the FET switch is ended due to the influence of the above-mentioned voltage division and zener diode V11. The operating point is typically set at approximately 50 volts, for example. Current can flow via the resistance R8 and led V10 and the light of the led V10 goes on to indicate that the necessary charging state has been reached. At the same time, the optosiolator generates the 'Enable' signal shown in FIG. 5 and an external 'Ready' signal to indicate that the rectifier is ready for charging.

According to a preferred embodiment of the invention, the voltage of the positive busbar of the auxiliary intermediate circuit is stored in a memory and used as a reference voltage instead of the voltage of the positive busbar. Storing of the voltage level is advantageous in particular when the mains supply to a rectifier in the diode mode is interrupted for a while due to high-speed automatic reclosing, for example. The inverter load may very rapidly drop the intermediate circuit voltage below the level at which it is safe to continue in the diode mode in respect of fuses when mains supply is restored.

Since voltage is fed into the auxiliary intermediate circuit through isolating diodes from the DC intermediate circuit, measurement of the voltage difference is no longer applicable in the preparation for returning supply voltage.

For this reason, the voltage value prevailing in the auxiliary intermediate circuit just before the switch to the charging mode is left in the memory according to the embodiment. It is easy to compare the voltage of the DC intermediate circuit with this information and draw the necessary conclusions. A digitally adjustable potentiometer, for example, may function as the memory element.

Circuit Solution for Diode Mode

Figure 5:
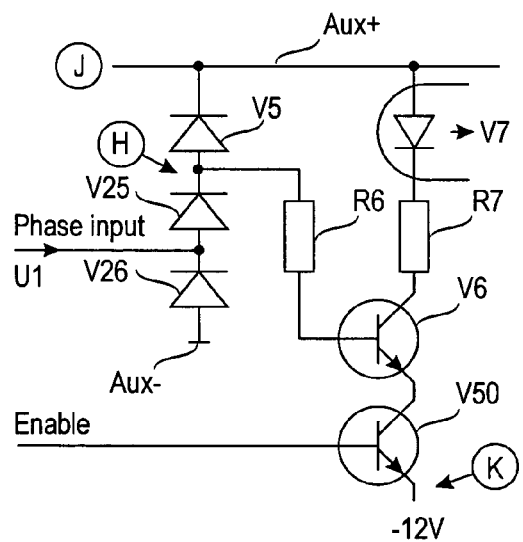
FIG. 5 illustrates a circuit solution for the diode mode.

FIG. 5 illustrates a schematic circuit solution for the diode mode. One of the significant parts in respect of the circuit is transistor B6, whose emitter is in potential K, which is 12 volts more negative than the positive busbar J of the auxiliary intermediate circuit. This requires, however, that the 'Enable' signal should be active and thus control switch V50. The transistor's collector is provided with an optoisolator V7, whose output controls the thyristor gate current. The transistor base is connected to the point between the diodes V25 and V5 that form the upper branch of the auxiliary intermediate circuit bridge. The diode V26 is the lower branch of this bridge. FIG. 5 further illustrates resistances R6 and R7.

The transistor V6 base current can be generated only when the potential at point H sufficiently exceeds the potential of point K. This happens when the voltage level of the phase output exceeds level K by a few volts. Due to the base current, the led V7 of the optoisolator is lit up and it generates gate current for the thyristor.

Gate Current Control

Figure 6:
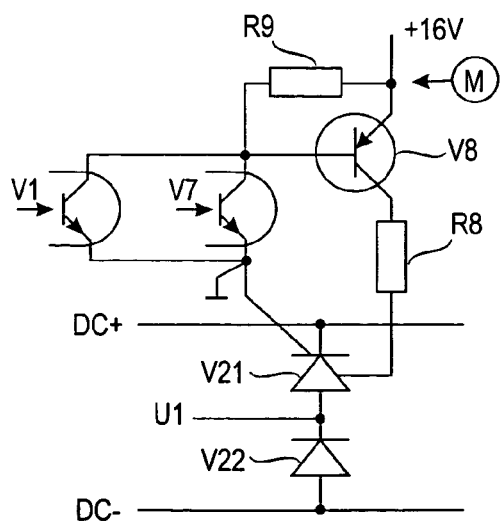
FIG. 6 illustrates a circuit solution for controlling gate current.

The thyristor gate current is controlled by the basic circuit shown in FIG. 6. Transistor V8, whose emitter is connected to voltage M which is 16 volts higher than the transistor auxiliary cathode potential, functions as the gate current switch. The gate current is limited by gate resistance R8. The circuit also includes resistance R9 in a known manner.

The transistor V8 base current is controlled by optoisolators V1 (FIG. 2) and V7 (FIG. 5). Since the optoisolators are connected in parallel, either of them may generate a gate pulse when activated.

The function of the optoisolator V7 is, however, prevented in the charging mode (FIG. 5, signal 'Enable'), in which case only the optoisolator V1 can generate gate pulses. In the diode mode, on the other hand, the function of the optoisolator V1 is prevented (FIG. 2, signal 'Diode mode').

It is obvious to a person skilled in the art that as technology advances, the inventive concept can be implemented in various ways. The invention and its embodiments are thus not limited to the examples described above but they may vary within the scope of the claims.

What is claimed is:

1. A method of controlling a half-controlled rectifier, the rectifier comprising:

positive and a negative busbar of a DC intermediate circuit, a capacitor of the DC intermediate circuit, which is connected between the positive and the negative busbar of the DC intermediate circuit, and phase-specific series connections of a diode and a gate-triggered semiconductor component, which are connected between the positive and the negative busbar of the DC intermediate circuit so that the anode of the diode is connected to the anode of the gate-triggered semiconductor component, and the cathode of the gate-triggered semiconductor component is connected to the positive busbar, whereby each of the points between the diodes and the gate-triggered semiconductor components forms the input of one phase for the voltage to be rectified, wherein the rectifier further comprises an auxiliary intermediate circuit, which comprises a positive and a negative busbar and phase-specific series connections of two diodes connected to the auxiliary intermediate circuit, where the anode of the first diode is connected to the anode of the second diode and the cathode of the second diode is connected to the positive busbar of the auxiliary intermediate circuit, whereby each of the points between the diodes connected in series is connected to the input of the voltage to be rectified, a first isolating diode, which is connected between the positive busbar of the DC intermediate circuit and the positive busbar of the auxiliary circuit so that the cathode of the first isolating diode is connected to the positive busbar of the auxiliary intermediate circuit and the anode to the positive busbar of the DC intermediate circuit, and a second isolating diode, which is connected between the negative busbar of the DC intermediate circuit and the negative busbar of the auxiliary circuit so that the anode of the second isolating diode is connected to the negative busbar of the auxiliary intermediate circuit and the cathode to the negative busbar of the DC intermediate circuit, whereby the method comprises the following steps during charging of the DC intermediate circuit forming rectified voltage functioning as the target voltage for the DC intermediate circuit from the inputs of the auxiliary intermediate circuit, forming phase-specific trigger pulses for the gate-triggered semiconductor components, advancing trigger pulses with respect to a network cycle of the supply voltage, which increases the conducting time of the gate-triggered semiconductor components and the voltage of the DC intermediate circuit, determining phase currents of inputs in a phase-specific manner, comparing phase currents with a phase current limit, delaying ignition pulses when the phase current exceeds the phase current limit, comparing the voltage of the DC intermediate circuit with the target voltage, controlling the gate-triggered components to the conductive state for the maximum time when the difference between the target voltage and the voltage of the DC intermediate circuit is below a predetermined limit.

2. A method according to claim 1, wherein the method further comprises the steps of:
- storing the voltage of the positive busbar of the auxiliary intermediate circuit,
- using the stored voltage as the target voltage.

3. A method according to claim 1, wherein the method comprises the steps of
- comparing the phase voltages with the voltage of the positive busbar of the auxiliary intermediate circuit in a phase-specific manner,
- generating gate current in a phase-specific manner for the gate-triggered component when the phase voltage is higher than the voltage which is a predetermined amount lower than the positive busbar.

4. A method according to claim 1, wherein the generation and advancing of trigger pulses comprises the steps of
- forming a substantially triangular voltage wave form comparable to each phase voltage of the voltage to be rectified,
- generating phase-specific rising ramp voltages, which substantially have a constant rising rate,
- comparing the triangular voltage with the ramp voltage in a phase-specific manner,
- triggering the gate-triggered semiconductor component to the conductive state on the basis of the comparison when the triangular voltage is smaller than the ramp voltage,
- determining phase currents of inputs in a phase-specific manner,
- comparing phase currents with the phase current limit, and
- decreasing the ramp voltage when the phase current exceeds the phase current limit.

5. A rectifier structure which comprises a positive and a negative busbar of a DC intermediate circuit,
- a capacitor of the DC intermediate circuit, which is connected between the positive and the negative busbar of the DC intermediate circuit, and
- a half-controlled rectifying bridge, which comprises phase-specific series connections of a diode and a gate-triggered semiconductor component, which are connected between the positive and the negative busbar of the DC intermediate circuit so that the anode of the diode is connected to the anode of the gate-triggered semiconductor component, and the cathode of the gate-triggered semiconductor component is connected to the positive busbar, whereby each of the points between the diodes and the gate-triggered semiconductor components forms the input of one phase for the voltage to be rectified, wherein the rectifier further comprises an auxiliary intermediate circuit, which comprises a positive and a negative busbar and phase-specific series connections of two diodes connected to the auxiliary intermediate circuit, where the anode of the first diode is connected to the anode of the second diode and the cathode of the second diode is connected to the positive busbar of the auxiliary intermediate circuit, whereby each of the points between the diodes connected in series is connected to the input of the voltage to be rectified, a first isolating diode, which is connected between the positive busbar of the DC intermediate circuit and the positive busbar of the auxiliary circuit so that the cathode of the first isolating diode is connected to the positive busbar of the auxiliary intermediate circuit and the anode to the positive busbar of the DC intermediate circuit, and a second isolating diode, which is connected between the negative busbar of the DC intermediate circuit and the negative busbar of the auxiliary circuit so that the anode of the second isolating diode is connected to the negative busbar of the auxiliary intermediate circuit and the cathode to the negative busbar of the DC intermediate circuit.

6. A rectifier structure according to claim 5, wherein the rectifier structure further comprises a transient overvoltage protector, which is connected between the positive and the negative busbar of the auxiliary intermediate circuit.

7. A rectifier structure according to claim 5, wherein a power source is arranged in the rectifier structure, whereby the auxiliary intermediate circuit is arranged to feed voltage into the power source.

* * * * *